United States Patent
Milbar et al.

(10) Patent No.: US 6,970,685 B2
(45) Date of Patent: Nov. 29, 2005

(54) METHOD AND APPARATUS FOR DYNAMIC FILTER SELECTION IN RADIO RECEIVERS

(75) Inventors: Marek Milbar, Huntingdon Valley, PA (US); Ashruf El-Dinary, Clarksville, MD (US)

(73) Assignee: iBiquity Digital Corporation, Columbia, MD (US)

(*) Notice: Subject to any disclaimer, the term of this patent is extended or adjusted under 35 U.S.C. 154(b) by 448 days.

(21) Appl. No.: 10/366,886

(22) Filed: Feb. 14, 2003

(65) Prior Publication Data

US 2004/0162048 A1    Aug. 19, 2004

(51) Int. Cl.[7] .............................. H04B 1/06; H04B 7/00
(52) U.S. Cl. ...................................... 455/266; 455/340
(58) Field of Search .......................... 455/550.1, 552.1, 455/180.1, 188.1, 266, 339, 340

(56) References Cited

U.S. PATENT DOCUMENTS

| | | |
|---|---|---|
| 5,339,455 A | 8/1994 | Vogt et al. |
| 5,423,064 A * | 6/1995 | Sakata ........................ 455/437 |
| 5,465,410 A | 11/1995 | Hiben et al. |
| 5,499,394 A * | 3/1996 | Kaatz et al. ................. 455/266 |
| 5,668,837 A | 9/1997 | Dent |
| 5,745,856 A | 4/1998 | Dent |
| 5,777,911 A | 7/1998 | Sherry et al. |
| 6,088,569 A | 7/2000 | Bach et al. |
| 6,178,211 B1 | 1/2001 | Whikehart et al. |
| 6,243,424 B1 | 6/2001 | Kroeger et al. |
| 6,307,599 B1 | 10/2001 | Komatsu |
| 6,430,227 B1 | 8/2002 | Kroeger et al. |

OTHER PUBLICATIONS

U.S. Appl. No. 10/210,143, filed Jul. 31, 2002, Vanness.

* cited by examiner

Primary Examiner—Nguyen T. Vo
(74) Attorney, Agent, or Firm—Robert P. Lenart, Esq.; Pistragallo, Bosick & Gordon (57) ABSTRACT

A method for processing a radio signal which may include a narrowband signal or a wideband signal or both, comprises the steps of receiving the radio signal, initially processing the radio signal using a narrowband filter, switching to a wideband filter for further processing of the radio signal, determining if the wideband signal is acquired, and if the wideband signal is not acquired, alternating between narrowband filter processing for a narrowband filter hold time and wideband filter processing for a wideband filter hold time, where the narrowband filter hold time is gradually increased until a predetermined maximum time limit is reached. If the wideband signal is acquired, the narrowband filter hold time can be set to a predetermined minimum time limit. Receivers which implement the method are also provided.

20 Claims, 6 Drawing Sheets

METHOD AND APPARATUS FOR DYNAMIC FILTER SELECTION IN RADIO RECEIVERS

FIELD OF THE INVENTION

This invention relates to radio frequency signal reception and, more particularly, to methods of, and apparatus for, receiving radio signals in a digital audio broadcasting environment.

BACKGROUND OF THE INVENTION

Digital Audio Broadcasting (DAB) is a medium for providing digital-quality audio, superior to existing analog broadcasting formats. Both AM and FM In-Band On-Channel (IBOC) DAB can be transmitted in a hybrid format where the digitally modulated signal coexists with the currently broadcast analog modulated AM or FM signal, or in an all-digital format where the analog signal has been eliminated. IBOC DAB requires no new spectral allocations because each DAB signal is transmitted within the spectral mask of an existing AM or FM channel allocation. IBOC DAB promotes economy of spectrum while enabling broadcasters to supply digital quality audio to their present base of listeners.

One hybrid FM IBOC DAB system places orthogonal frequency division multiplexed (OFDM) sub-carriers in the region from about 129 kHz to 199 kHz away from the FM center frequency, both above and below the spectrum occupied by an analog modulated host FM carrier. Some FM IBOC DAB options permit subcarriers starting as close as 100 kHz away from the center frequency. The bandwidth of the existing analog FM signal is significantly smaller than the bandwidth occupied by the OFDM subcarriers. In an all-digital FM IBOC DAB system, the analog modulated host FM carrier would be eliminated. Additional digitally modulated sub-carriers may be placed, then, in the band from which the analog FM carrier is removed. Examples of hybrid and all-digital FM IBOC DAB signals are shown in U.S. Pat. No. 6,430,227.

One hybrid AM IBOC DAB system places orthogonal frequency division multiplexed (OFDM) sub-carriers in the region from about 5 kHz to 15 kHz away from the AM center frequency, both above and below the spectrum occupied by an analog modulated host AM carrier, and another set of sub-carriers in the region occupied by the analog modulated AM carrier. The bandwidth of the existing analog AM signal is significantly smaller than the bandwidth occupied by the OFDM subcarriers. In an all-digital AM IBOC DAB system, the analog modulated host AM carrier would be eliminated. Examples of hybrid and all-digital AM IBOC DAB signals are shown in U.S. Pat. No. 6,243,424.

The previously broadcast analog modulated AM or FM signal is referred to herein as a legacy signal. Receivers must provide for the reception of the larger bandwidth IBOC DAB signal, while still maintaining the existing analog performance.

Combining legacy and advanced radio receivers technologies, poses several technical challenges. Potential areas of conflict involve aspects such as combined signal filtering and intermediate frequency signal gain control.

The introduction of IBOC DAB technology changes the legacy receiver signal processing chain. The legacy analog signal occupies a relatively narrow band, while the IBOC DAB related signal is present over much broader band. An IBOC DAB enabled receiver, which is based on existing components and includes IBOC DAB handling capability, has to deploy a relatively wide band filter, which at times may affect the reception and processing capability of the legacy signal. The combined receiver may encounter this problem when either the desired station broadcasts legacy analog signal only, or when the legacy analog signal is included in a hybrid IBOC DAB signal and is selected by the receiver.

This invention seeks to provide a method and apparatus for receiving an IBOC DAB signal, without adversely impacting the analog performance.

SUMMARY OF THE INVENTION

This invention provides a method for processing a radio signal which may include a narrowband signal or a wideband signal or both, wherein the method comprises the steps of: receiving the radio signal, initially processing the radio signal using a narrowband filter, switching to a wideband filter for further processing of the radio signal, determining if the wideband signal is acquired, and if the wideband signal is not acquired, alternating between narrowband filter processing for a narrowband filter hold time and wideband filter processing for a wideband filter hold time, where the narrowband filter hold time is gradually increased until a predetermined maximum time limit is reached. If the wideband signal is acquired, the narrowband filter hold time can be set to a predetermined minimum time limit. The wideband filter can initially be selected for a time period of at least two seconds.

In one embodiment of the invention, the narrowband signal can comprise an analog modulated carrier signal and the wideband signal can comprise an IBOC DAB signal.

The method can further comprise the step of tracking the wideband signal, and upon successful tracking of the wideband signal, continuing to use wideband filter processing.

Upon successful tracking of the wideband signal for more than a predetermined time period, the narrowband filter hold time can be decreased. Upon unsuccessful tracking of the wideband signal for more than a predetermined time period, the narrowband filter hold time can be increased. The narrowband hold time can be gradually increased for every faulty wideband signal acquisition that is followed up by a wideband signal tracking failure.

The invention also encompasses receivers for processing a radio signal which may include a narrowband signal and wideband signal, the receivers comprise means for receiving the radio signal, means for initially processing the radio signal using a narrowband filter, means for switching to a wideband filter for further processing of the radio signal, means for determining if the wideband signal is acquired, and if the wideband signal is not acquired, alternating between narrowband filter processing for a narrowband filter hold time and wideband filter processing for a wideband filter hold time, where the narrowband filter hold time is gradually increased until a predetermined maximum time limit is reached. If the wideband signal is acquired, the narrowband filter hold time can be set to a predetermined minimum time limit.

The method and apparatus of this invention applies to the reception of both hybrid and all-digital IBOC DAB signals, as well as the reception of analog modulated signals in combination with hybrid and all-digital IBOC DAB signals, or the reception of only analog modulated signals.

DETAILED DESCRIPTION OF THE INVENTION

Figure 1:
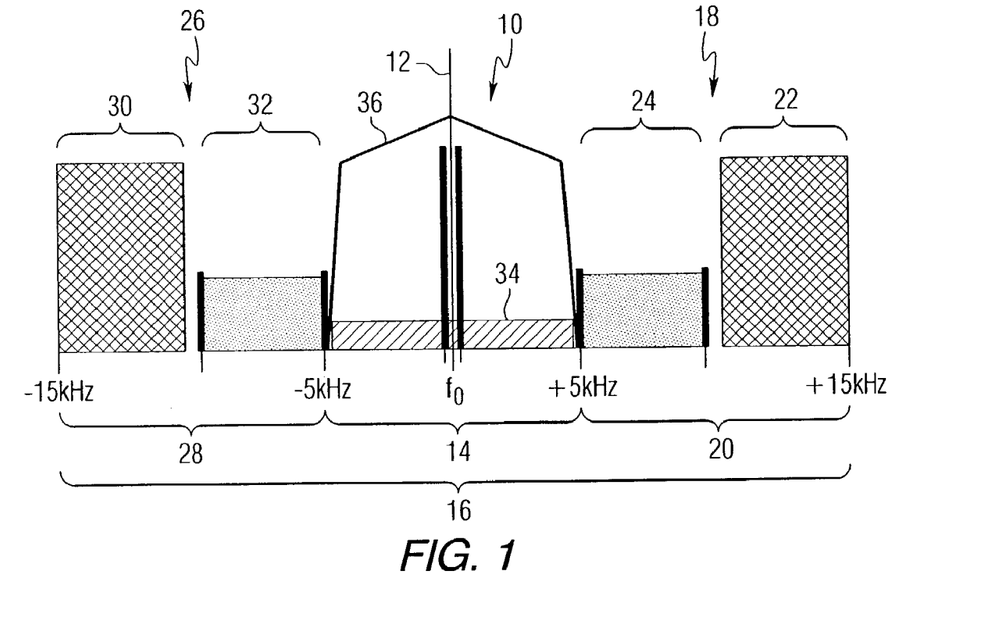
FIG. 1 is a schematic representation of an AM IBOC waveform.

Referring to the drawings, FIG. 1 is a schematic representation of an AM IBOC DAB waveform 10. The waveform includes an analog modulated carrier 12 in a central portion 14 of a radio channel 16. A first plurality of orthogonally frequency division modulated sub-carriers 18 is positioned in an upper sideband 20 and is divided into a first group of primary sub-carriers 22 and a second group of secondary sub-carriers 24. The upper sideband extends from about 5 kHz to about 15 kHz from the center of the channel. A second plurality of orthogonally frequency division modulated sub-carriers 26 is positioned in a lower sideband 28 and is divided into a first group of primary sub-carriers 30 and a second group of secondary sub-carriers 32. The lower sideband extends from about −5 kHz to about −15 kHz from the center of the channel. A third plurality of sub-carriers 34 is positioned in a central portion of the channel and is modulated in quadrature with the analog modulated carrier. The analog modulated carrier 12 produces a signal represented by envelope 36. In an all-digital AM IBOC DAB system, the analog modulated host AM carrier would be eliminated.

Figure 2:
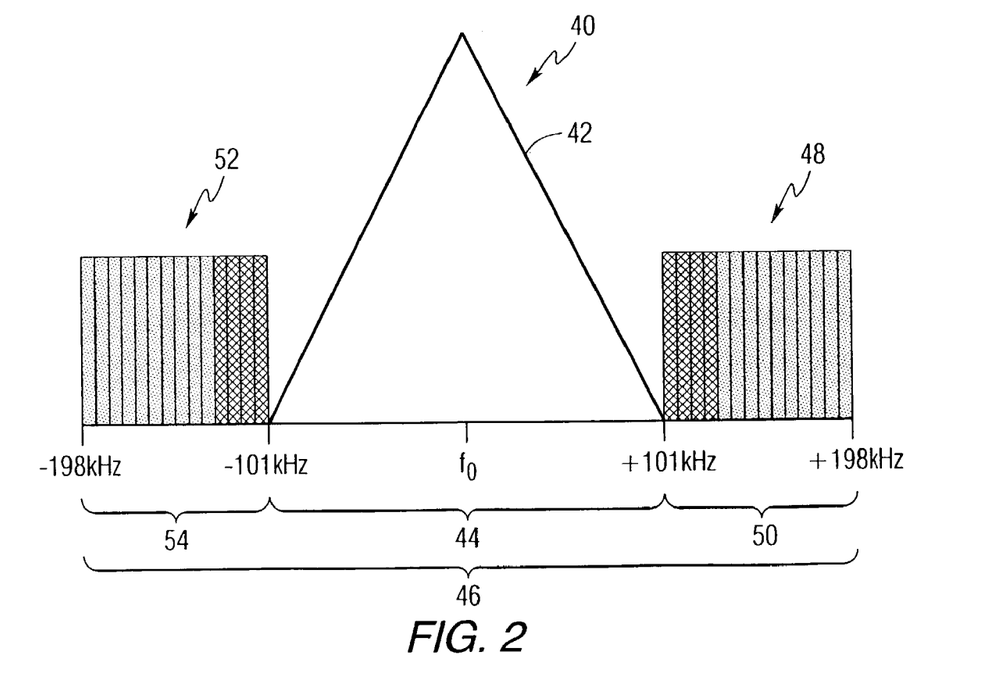
FIG. 2 is a schematic representation of an FM IBOC waveform.

FIG. 2 is a schematic representation of an FM IBOC DAB waveform 40. The FM IBOC DAB waveform 40 includes an analog modulated carrier 42 in a central portion 44 of a radio channel 46. A first plurality of orthogonally frequency division modulated sub-carriers 48 is positioned in an upper sideband 50. The upper sideband can extend from about 129 kHz to about 198 kHz from the center of the channel, or optionally from about 101 kHz to about 198 kHz from the center of the channel. A second plurality of orthogonally frequency division modulated sub-carriers 52 is positioned in a lower sideband 54. The lower sideband can extend from about −129 kHz to about −198 kHz from the center of the channel, or optionally from about −101 kHz to about −198 kHz from the center of the channel. In an all-digital FM IBOC DAB system, the analog modulated host FM carrier would be eliminated. Additional digitally modulated sub-carriers may be placed, then, in the band from which the analog FM carrier is removed.

Legacy analog FM signal receivers condition the received signal by using analog filters having pass bands that typically vary from 140 kHz to approximately 200 kHz. Additional signal conditioning is achieved by subsequent digital processing. Proper conditioning of an FM IBOC DAB signaling requires a pass band of approximately 550 kHz in addition to subsequent digital processing. The bandwidth conflict can be clearly seen. This conflict may affect the processing capabilities of the legacy analog signal. In addition, it may introduce a dilemma regarding the optimization of the IF (and maybe RF) gain control. Receivers that are capable of receiving both legacy and IBOC DAB signals can include components that may not have been initially designed for integrated legacy and IBOC DAB receivers. Narrowband or wideband based gain control, may be perceived differently by the legacy analog signal receiver and the IBOC DAB processor.

This invention provides methods and apparatus that resolve potential receiver performance degradation. Two examples of receiver architectures are presented in FIGS. 3 and 4, and include the addition of a filter and filter selection hardware. The difference between the two architectures is derived from actual legacy component capabilities. The architecture shown in FIG. 4 may be used to address gain control concerns. Actual implementations of this invention may be based on the embodiments of FIGS. 3 and 4, but may differ due to implementation specific considerations.

Figure 3:
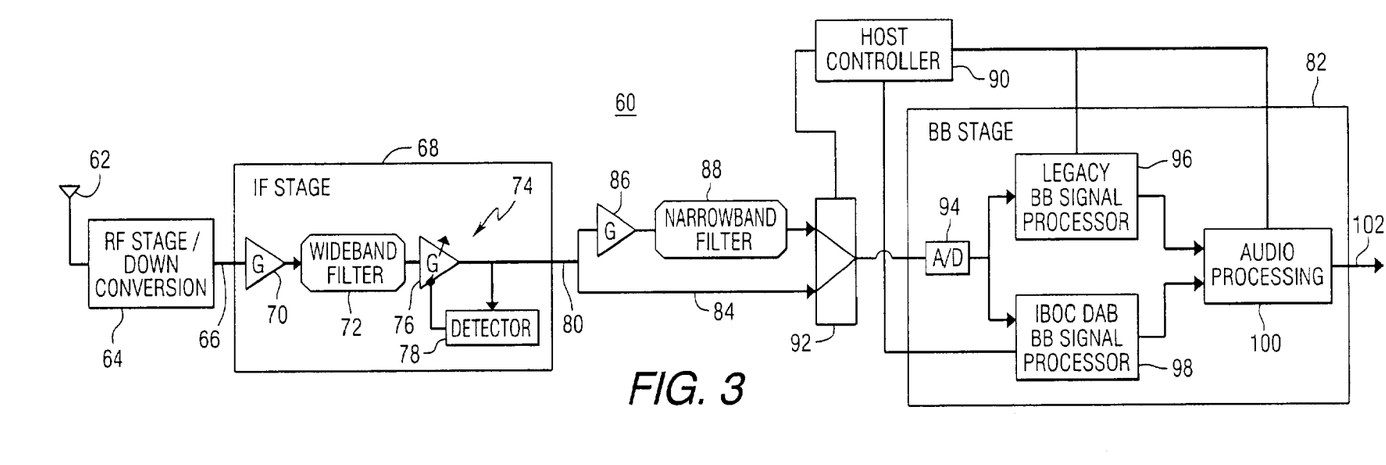
FIG. 3 is a schematic diagram of a radio receiver constructed in accordance with this invention.

The receiver 60 of FIG. 3 includes an antenna 62 for receiving the radio signal. A front end circuit 64 converts the received signal to an intermediate frequency (IF) signal on line 66. An IF stage 68 includes an amplifier 70, a wideband filter 72 and an automatic gain control 74 including an amplifier 76 and a detector 78, and produces a filtered signal on line 80. The filtered signal is sent to the baseband stage 82 either directly as shown by line 84, or through an amplifier 86 and a narrowband filter 88. A host controller 90 monitors the baseband stage and can determine the path of the filtered signal as illustrated by block 92. The baseband stage includes an analog-to-digital converter 94 that delivers its digital output to both a legacy baseband processor 96 and an IBOC DAB baseband processor 98. The outputs of the processors are further subject to audio processing as illustrated by block 100 to produce an output signal on line 102.

In the configuration shown in FIG. 3, the intermediate frequency (IF) stage is not controlled dynamically. The only modification to that stage is the replacement of the original narrowband (Legacy analog compliant) filter with a wideband (IBOC DAB compatible) filter. The conditioned IF signal is split and passed to the single A/D. The host processor has the ability to select the signal path provided to the A/D. It can select the wideband output from the IF stage or a narrowband signal. The selection can be preset or dynamic, deploying a suitable process.

If the baseband (BB) stage includes two separate inputs and A/D components, then no selection is required and each processing path can use the appropriately conditioned signal. It should be noted that in the receiver configuration of FIG. 3, the automatic gain control (AGC) is not controlled externally and is operated based on wideband filtering.

Figure 4:
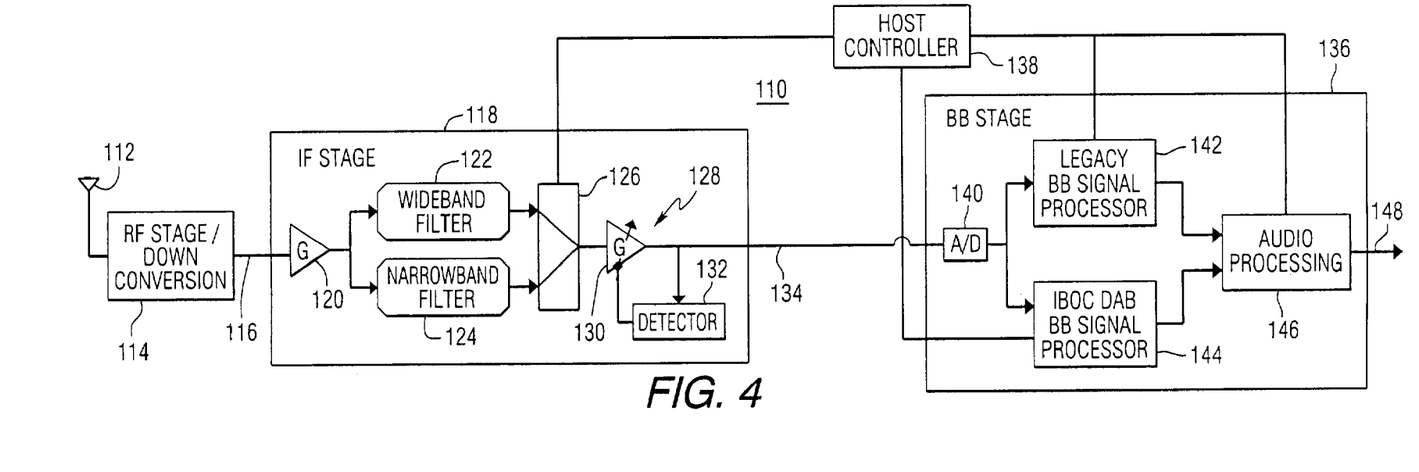
FIG. 4 is a schematic diagram of another radio receiver constructed in accordance with this invention.

The receiver 110 of FIG. 4 includes an antenna 112 for receiving the radio signal. A front end circuit 114 converts the received signal to an intermediate frequency (IF) signal on line 116. An IF stage 118 includes an amplifier 120, a wideband filter 122, a narrowband filter 124, a switching circuit 126, and an automatic gain control 128 including an amplifier 130 and a detector 132, and produces a filtered signal on line 134. The filtered signal is sent to the baseband stage 136. A host controller 138 monitors the baseband stage and can determine the path of the filtered signal as illustrated by block 126. The baseband stage includes an analog-to-digital converter 140 that delivers its digital output to both a legacy baseband processor 142 and an IBOC DAB baseband processor 144. The outputs of the processors are further subject to audio processing as illustrated by block 146 to produce an output signal on line 148.

In the configuration shown in FIG. 4, the IF stage is controlled, providing the ability to select the desired filter for subsequent signal conditioning. In this case, the AGC is not controlled, but the process complies with the signal bandwidth that is passed to the BB stage. It does not matter whether the BB stage includes a single A/D converter or two separate but identical A/D converters. Having two non-identical A/D components may be of an advantage to the legacy signal processing when the wideband filter is selected.

While filter selection could be done by a semi-preselection, based on initial conditions, dynamic selection may significantly improve the performance of the integrated receiver. The selection process has to consider the need to accommodate several combinations of desired and undesired signals, including a legacy analog signal, a hybrid IBOC DAB waveform, and an all-digital IBOC DAB signals. In addition, it has to consider the availability of signal condition indications, as may be provided by the IBOC DAB baseband processing chain and by the legacy signal processor.

Figures 5, 5A:
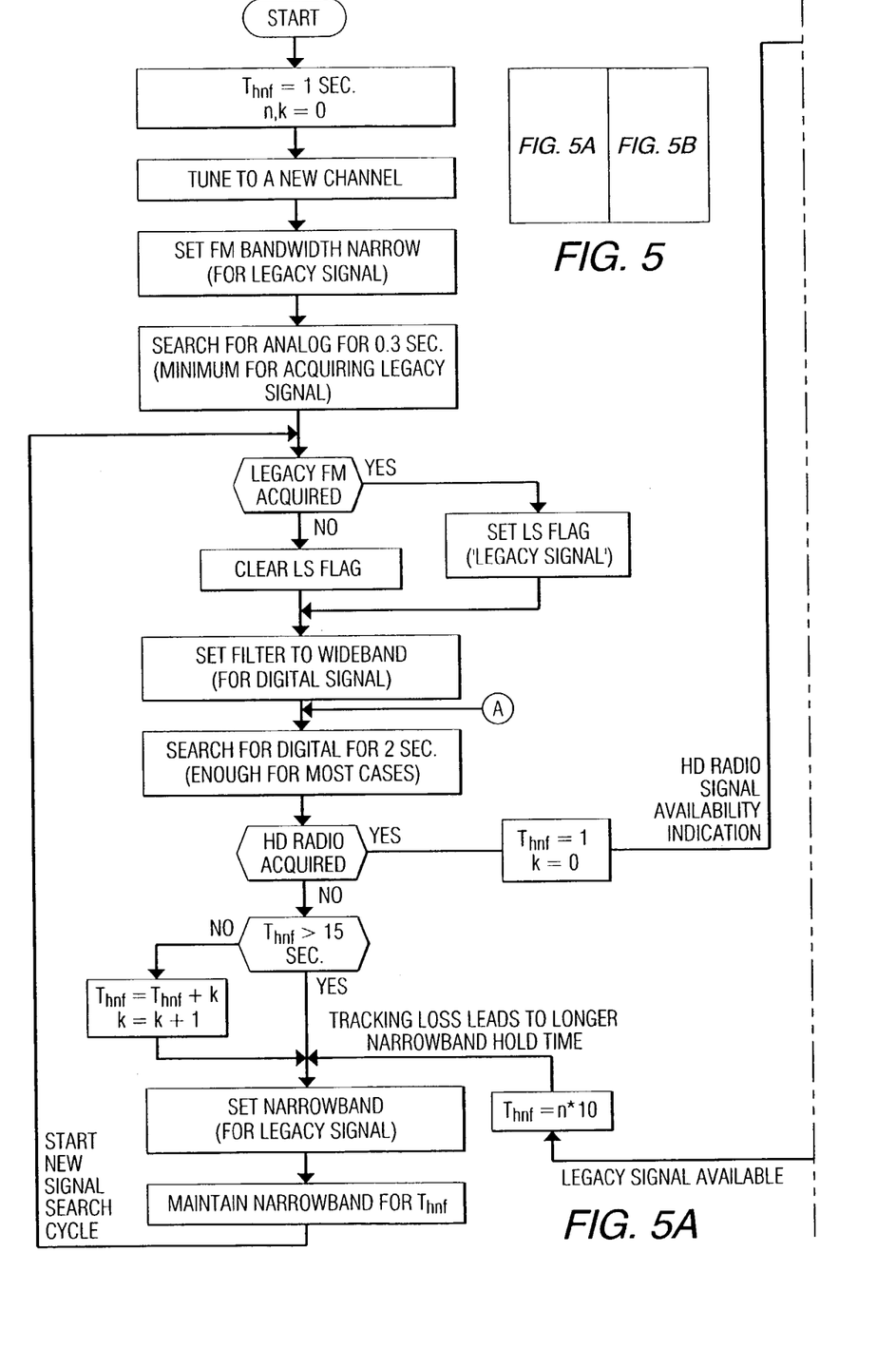
FIGS. 5, 5A and 5B show a flow diagram illustrating the method of this invention for use in an FM receiver.
Figure 5B:
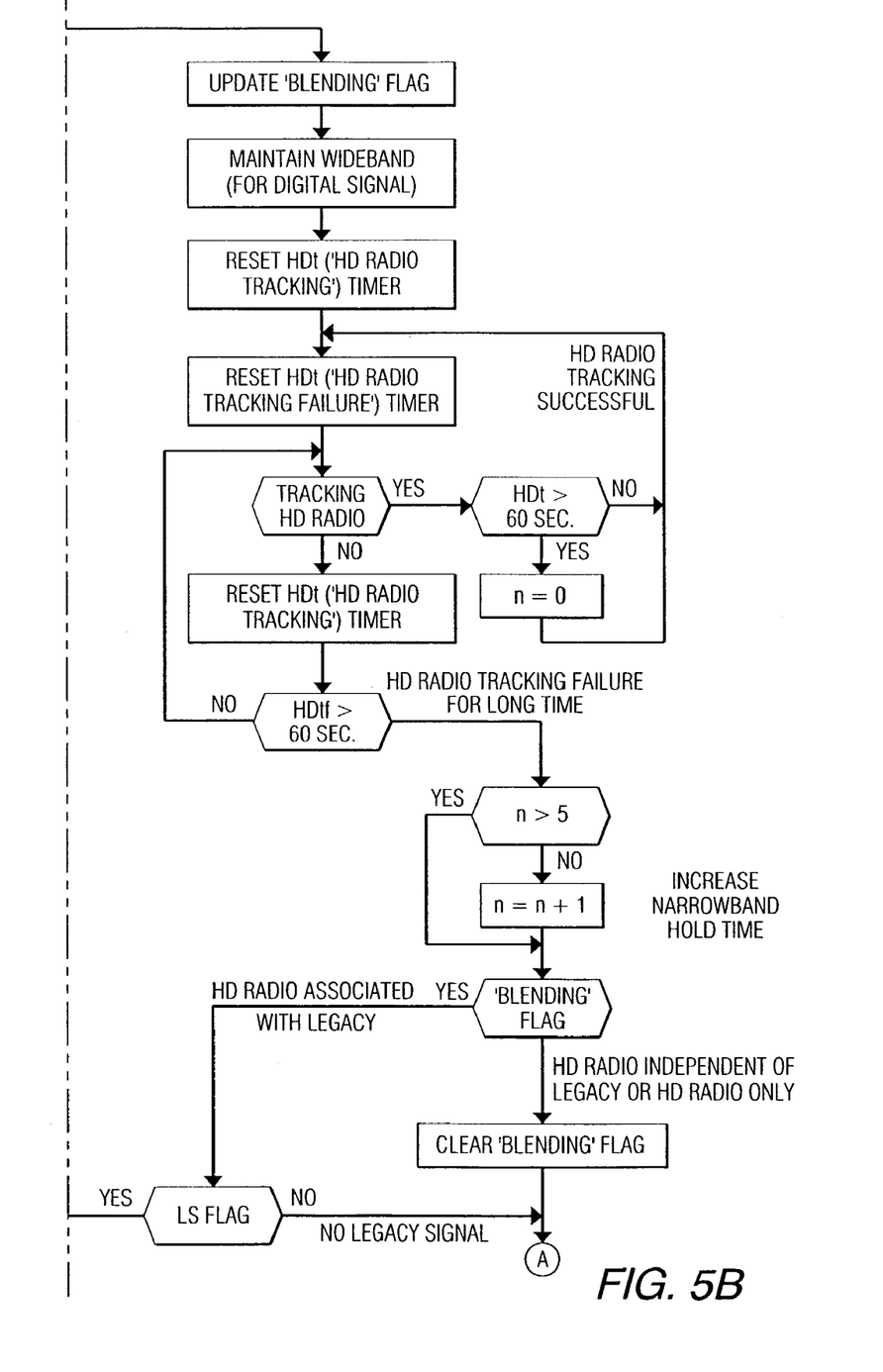

A filter selection process in accordance with this invention, that takes into account several cases of channel conditions, along with the signal dynamics, is shown in FIGS. 5, 5A and 5B.

The process makes use of the following indications made available by the IBOC DAB baseband processor: (1) an initial indication that IBOC DAB signal was found and may be available; and (2) an indication that the IBOC DAB processor is tracking the signal.

It is also possible to make use of an audio related quality indication, if an audio component is confirmed to be present. However, taking into account that the broadcasting format and content is set by the broadcaster and may vary, no use of audio quality related information is made in the embodiments described herein.

The method has been designed based on the following considerations:

Acquiring a legacy signal and providing legacy audio services is assumed to be much faster than the same process for IBOC DAB. Therefore, initial priority is given to legacy signals.

The absence of confirmation of the presence of an IBOC DAB signal may be considered insignificant information that should have very little effect on the steady state filter handling. Positive confirmation of invalidity of potential IBOC DAB signal, such as indicated by a long term tracking failure, may be considered as significant information that should result in reprioritizing the filter selection.

The numbers in the process illustrated in FIGS. 5, 5A and 5B, can be adjusted based upon a receiver manufacturer's preferences. But note that a reduction in the HDtf threshold may affect the IBOC DAB processor's ability to quickly recover from an instantaneous signal loss. Also note that in FIGS. 5A, 5B, 6A and 6B, the term "HD Radio" refers to an IBOC DAB signal. HD Radio is a trademark of iBiquity Digital Corporation. Furthermore, in FIGS. 5A, 5B, 6A and 6B, "HD radio acquired", "HD radio tracking", and the "no blending flag" are all indicated by the HD radio signal. "No blending" means that there is no association of the digital content of the HD radio signal with any analog signal content. In addition, $T_{hnf}$ stands for the "hold narrow filter" time.

The timers and counters used to implement the method of FIGS. 5, 5A and 5B are initialized upon tuning to a new channel or power-up. At first, a narrowband filter is selected, in order to support fast legacy signal lock, in unknown channel conditions. After the very short initial legacy signal prioritized support, the process logs the legacy receiver indications and selects the wideband filter. The wideband filter should be selected for no less than 2 seconds, in order to guarantee a high probability of IBOC DAB signal acquisition, if such signal is available. Failure to acquire the IBOC DAB signal, as indicated by IBOC DAB processor, leads to a progressive change in the filter switching timing, where the time assigned to the narrowband filter is gradually increased in small steps, until it reaches to a preset limit. The actual limit may be set by each receiver manufacturer individually.

Success in IBOC DAB acquisition, as indicated by the IBOC DAB processor, sets the narrowband timing to its minimum, leaves the wideband filter selection in place and triggers a new cycle of observing the IBOC DAB signal tracking status, as indicated by the IBOC DAB processor. Successful tracking would result in no changes at all, and if it lasts more than 60 seconds (can be set by manufacturers), it may lead to resetting hold time variable (n) that is used upon failure.

If tracking continuously fails over more than a predetermine time, of for example 60 seconds, then it is considered a positive confirmation of an unavailable or unusable IBOC DAB signal and the narrowband filter hold time variable (n) is increased. The hold time increase 'penalty' is applied, until the hold time reaches a maximum. If the legacy signal is available and the IBOC DAB signal is indicated to be associated with the legacy signal, then the alternating filter cycle is invoked again, but this time with a much longer narrowband filter hold time. This process is progressive and the narrowband hold time is gradually increased for every faulty IBOC DAB signal acquisition that is followed up by an immediate (or nearly immediate) tracking failure.

If, however, the legacy signal is not available or if the tracking failure follows usage of IBOC DAB signal that is not associated with a legacy signal, then the hold time increase 'penalty' is not imposed, because an audio blending process is not taking place. In that case the acquisition search cycle is re-invoked, starting with the minimum narrowband hold time.

It should be noted that observing (and acting upon) the tracking failure indication interval for less than 60 seconds, as in the disclosed embodiments, may slow the IBOC DAB processor in recovering from instantaneous channel impairments. Also, it should be noted that the host processor should read the IBOC DAB processor indications at a reasonable rate, for example every 100 msec or more frequently. Otherwise, changes in the indications may be missed, leading to improper decisions.

The IBOC DAB filter selection mechanism supports the selection of audio source (if implemented by the receiver manufacturer). It would be possible to associate the filter selection process with program selection (for either legacy or IBOC DAB signals). However, such an association may result in noticeable delays and other effects when the IBOC DAB signal is re-selected. The undesired effects may be even more pronounced if the IBOC DAB program is not associated with the legacy signal program or when the all-digital IBOC DAB signal is in use, and therefore may not be recommended in those cases.

In the embodiment of FIG. 4, filter switching should be done over time, creating some 'smoothing' effect, to guarantee reliable signal level changes, as introduced to the AGC section in the tuner. The smoothing method and timing should be associated with the AGC timing. Therefore, the switching should be perceived no differently than typical signal variations over typical channel conditions, such as fading and interference.

Legacy analog AM signal receivers condition the received signal by deploying analog filters having pass bands that typically vary from 9 kHz to approximately 20 kHz. Additional signal conditioning may be achieved by subsequent digital processing. Proper conditioning of IBOC DAB signals requires a pass band of approximately 35 kHz in addition to subsequent digital processing. This bandwidth conflict may affect the processing capabilities of the legacy analog signal. Narrowband or wideband based gain control may be required. It may be perceived differently by the legacy analog signal receiver and the IBOC DAB processor.

Architectural solutions, intended to resolve potential performance degradation, are shown in FIGS. 3 and 4. If gain control is considered important enough, then configuration FIG. 4 should be the basis for the desired architecture.

Figures 6, 6A:
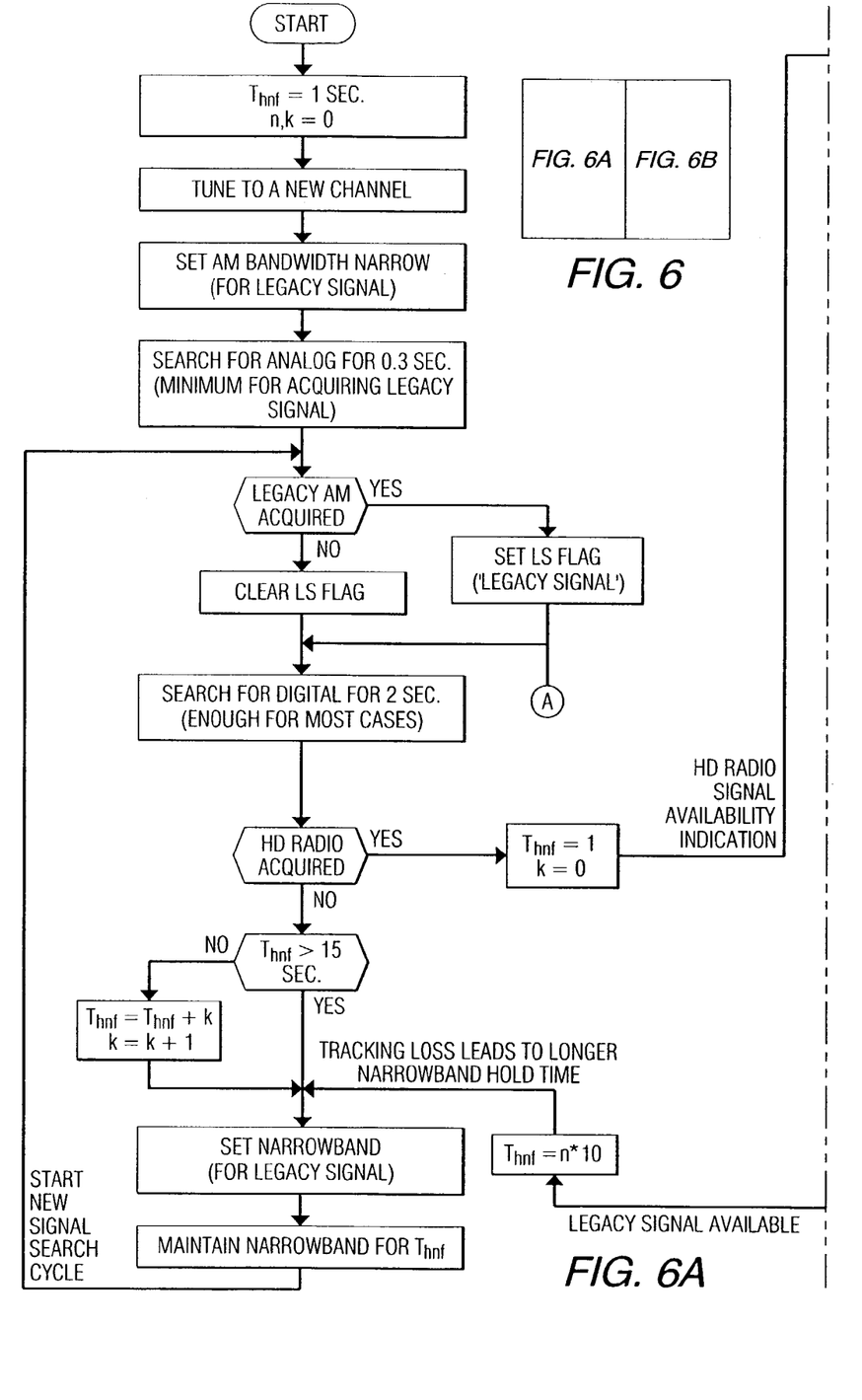
FIGS. 6, 6A and 6B show a flow diagram illustrating the method of this invention for use in an AM receiver.
Figure 6B:
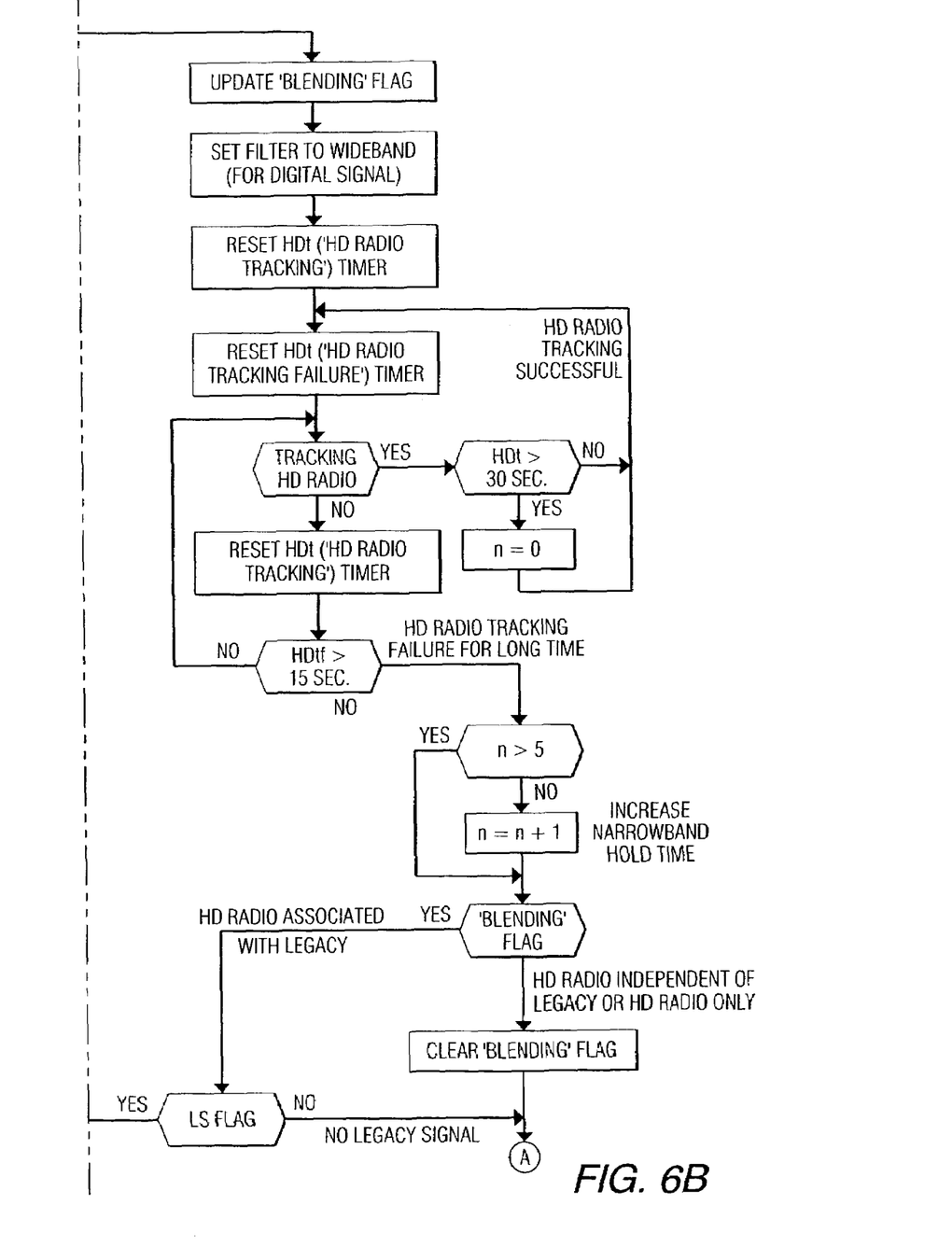

The filter selection process for AM receivers is similar to that for FM. The same type of indications and the same priorities and considerations govern the process. However, the IBOC DAB AM signal can be acquired (only) using a narrowband filter. Therefore, in this process the filter does not change and remains narrowband, as long as the IBOC DAB receiver does not indicate acquisition. A possible selection process that takes into account several cases of channel conditions, along with the signal dynamics, is shown in FIGS. 6, 6A and 6B.

When acquisition is indicated, the wideband filter is selected and a tracking indication is observed. Successful tracking would result in no changes at all, and if it lasts more than a predetermined time, such as 30 seconds, it may lead to resetting of the narrow band filter hold time variable (n) that is used upon failure.

If tracking continuously fails over more than a predetermined time, for example 15 seconds, then it can be considered a positive confirmation of unavailable or unusable IBOC DAB signal and the narrow band filter hold time variable (n) can be increased.

It should be noted that observing (and acting upon) the tracking failure indication interval for less than 15 seconds, as in the disclosed embodiment, may slow the IBOC DAB processor in recovering from instantaneous channel impairments. Also, it should be noted that the host processor should read the IBOC DAB processor indications at reasonable rate, for example every 200 msec or more frequently. Otherwise, changes in the indications may be missed, leading to improper decision.

This invention provides a general progressive approach to bandwidth management that may also be applicable to gain control management. It addresses a typical IBOC DAB enabled receiver configuration and lays out an adjustable solution. The approach may serve as the basis for any configuration specific or manufacturer specific solution.

While the invention has been described in terms of several embodiments, it should be understood that various modifications could be made to the disclosed embodiments without departing from the scope of the invention as defined by the following claims. In particular, the various components (or the functions performed) in FIGS. 3 and 4 can be combined, and/or additional components and/or functions can be added without departing from the scope of the invention. For example, two port base band processing could be used. Furthermore, the time durations and the other numbers shown in the example embodiments can be changed to tune the invention in specific implementations.

What is claimed is:

1. A method for processing a radio signal which may include a narrowband signal or a wideband signal or both, the method comprising the steps of:
   receiving the radio signal;
   initially processing the radio signal using a narrowband filter;
   switching to a wideband filter for further processing of the radio signal;
   determining if the wideband signal is acquired; and
   if the wideband signal is not acquired, alternating between narrowband filter processing for a narrowband filter hold time and wideband filter processing for a wideband filter hold time, where the narrowband filter hold time is gradually increased until a predetermined maximum time limit is reached.

2. The method of claim 1, wherein if the wideband signal is acquired, the narrowband filter hold time is set to a predetermined minimum time limit.

3. The method of claim 1, wherein the narrowband signal comprises an analog modulated carrier signal and wherein the wideband signal comprises an IBOC DAB signal.

4. The method of claim 1, wherein the wideband filter is selected for at least two seconds.

5. The method of claim 1, further comprising the step of:
   tracking the wideband signal; and
   upon successful tracking of the wideband signal, continuing to use wideband filter processing.

6. The method of claim 5, wherein upon successful tracking of the wideband signal for more than a predetermined time period, the narrowband filter hold time is decreased.

7. The method of claim 5, wherein upon unsuccessful tracking of the wideband signal for more than a predetermined time period, the narrowband filter hold time is increased.

8. The method of claim 5, wherein the narrowband hold time is gradually increased for every faulty wideband signal acquisition that is followed up by a wideband signal tracking failure.

9. The method of claim 1, wherein if the narrowband signal is available and the wideband signal is indicated to be associated with the narrowband signal, then alternating between narrowband signal processing and wideband signal processing using a longer narrowband filter hold time.

10. The method of claim 9, further comprising the step of blending the narrowband signal and the wideband signal to produce an audio output.

11. A receiver for processing a radio signal which may include a narrowband signal or a wideband signal or both, the receiver comprising:
    means for receiving the radio signal;
    means for initially processing the radio signal using a narrowband filter;
    means for switching to a wideband filter for further processing of the radio signal;
    means for determining if the wideband signal is acquired; and
    if the wideband signal is not acquired, alternating between narrowband filter processing for a narrowband filter hold time and wideband filter processing for a wideband filter hold time, where the narrowband filter hold time is gradually increased until a predetermined maximum time limit is reached.

12. The receiver of claim 11, wherein if the wideband signal is acquired, the narrowband filter hold time is set to a predetermined minimum time limit.

13. The receiver of claim 11, wherein the narrowband signal comprises an analog modulated carrier signal and wherein the wideband signal comprises an IBOC DAB signal.

14. The receiver of claim 11, wherein the wideband filter is selected for at least two seconds.

15. The receiver of claim 11, further comprising:
means for tracking the wideband signal.

16. The receiver of claim 15, wherein upon successful tracking of the wideband signal for more than a predetermined time period, the narrowband filter hold time is decreased.

17. The receiver of claim 15, wherein upon unsuccessful tracking of the wideband signal for more than a predetermined time period, the narrowband filter hold time is increased.

18. The receiver of claim 15, wherein the narrowband hold time is gradually increased for every faulty wideband signal acquisition that is followed up by a wideband signal tracking failure.

19. The receiver of claim 11, wherein if the narrowband signal is available and the wideband signal is indicated to be associated with the narrowband signal, then alternating between narrowband signal processing and wideband signal processing using a longer narrowband filter hold time.

20. The receiver of claim 19, further comprising means for blending the narrowband signal and the wideband signal to produce an audio output.

* * * * *

UNITED STATES PATENT AND TRADEMARK OFFICE
CERTIFICATE OF CORRECTION

PATENT NO.        : 6,970,685 B2
APPLICATION NO. : 10/366,886
DATED             : November 29, 2005
INVENTOR(S)       : Marek Milbar and Ashruf El-Dinary

It is certified that error appears in the above-identified patent and that said Letters Patent is hereby corrected as shown below:

Title Page
Item (74), Attorney, Agent, or Firm, "Pistragallo," should read -- Pietragallo --

Column 4, Line 41
"AID" should read --A/D --

Signed and Sealed this

Twenty-second Day of August, 2006

JON W. DUDAS
*Director of the United States Patent and Trademark Office*